United States Patent
Rice

(10) Patent No.: US 9,573,231 B2
(45) Date of Patent: Feb. 21, 2017

(54) METHOD OF SIMULTANEOUSLY TENSIONING MULTIPLE JACKBOLTS OF A MULTI-JACKBOLT TENSIONER AND HANDHELD APPARATUS FOR PERFORMING SAME

(71) Applicant: David Rice, Wexford, PA (US)

(72) Inventor: David Rice, Wexford, PA (US)

( * ) Notice: Subject to any disclaimer, the term of this patent is extended or adjusted under 35 U.S.C. 154(b) by 716 days.

(21) Appl. No.: 13/956,781

(22) Filed: Aug. 1, 2013

(65) Prior Publication Data

US 2014/0245869 A1 Sep. 4, 2014

Related U.S. Application Data

(60) Provisional application No. 61/772,495, filed on Mar. 4, 2013.

(51) Int. Cl.
| | |
|---|---|
| B25B 17/00 | (2006.01) |
| B25B 21/00 | (2006.01) |
| B25B 23/00 | (2006.01) |
| B23P 19/06 | (2006.01) |
| F16B 31/04 | (2006.01) |

(52) U.S. Cl.
CPC ......... *B23P 19/067* (2013.01); *B23P 19/069* (2013.01); *F16B 31/043* (2013.01)

(58) Field of Classification Search
CPC ....... B23P 19/069; B23P 19/067; B25B 29/02
USPC .............................................. 81/57.22, 57.14
See application file for complete search history.

(56) References Cited

U.S. PATENT DOCUMENTS

| | | | |
|---|---|---|---|
| 2,069,882 A | 2/1937 | Hall | |
| 2,644,357 A * | 7/1953 | Farmer ................. | B23P 19/069 81/57.22 |
| 2,781,682 A * | 2/1957 | Herndon ............... | B23P 19/069 74/664 |
| 3,845,673 A | 11/1974 | Karden et al. | |
| 3,905,254 A | 9/1975 | Palatnick et al. | |
| 4,533,337 A | 8/1985 | Schoeps | |
| 4,581,812 A * | 4/1986 | Yamanaga ............ | B23P 19/069 408/53 |
| 4,622,730 A | 11/1986 | Steinbock | |
| 4,909,105 A | 3/1990 | Namiki et al. | |

(Continued)

FOREIGN PATENT DOCUMENTS

JP 09216172 A * 8/1997 ............. B25B 21/00

*Primary Examiner* — Bryan R Muller
(74) *Attorney, Agent, or Firm* — Blynn L. Shideler; Krisanne Shideler; BLK Law Group

(57) ABSTRACT

A driving apparatus is used for simultaneously tensioning the jackbolts of a multi-jackbolt tensioner and includes a central drive gear mounted for rotation along a central drive gear axis. An annular array of spindles surrounds the central drive gear, each spindle independently mounted for rotation, with one spindle associated with one of the jackbolts. A socket on one spindle end is configured to receive one of the jackbolts. A spindle gear surrounds each spindle and is configured to rotate the spindle. The spindle gear is meshed with the central drive gear to be rotated by the central drive gear, wherein at least one spindle gear is offset along the central drive gear axis from at least another spindle gear. A slip clutch is positioned radially between each spindle gear and the associated spindle, wherein rotation of the jackbolts is up to a torque setting of the slip clutch during tensioning.

18 Claims, 2 Drawing Sheets

(56) References Cited

U.S. PATENT DOCUMENTS

| | | | |
|---|---|---|---|
| 4,927,305 A | 5/1990 | Peterson, Jr. | |
| RE33,490 E | 12/1990 | Steinbock | |
| 4,989,478 A | 2/1991 | Trivedi et al. | |
| 5,075,950 A | 12/1991 | Steinbock | |
| 5,083,889 A | 1/1992 | Steinbock | |
| 5,092,410 A | 3/1992 | Wallace et al. | |
| 5,125,298 A | 6/1992 | Smith | |
| 5,572,905 A | 11/1996 | Cook, Jr. | |
| 6,112,396 A | 9/2000 | Steinbock | |
| 6,253,644 B1 | 7/2001 | Duquette | |
| 6,834,567 B2 * | 12/2004 | Rosetto | B23P 19/069 81/467 |
| 7,628,097 B2 | 12/2009 | Tsuyoshi et al. | |
| 2006/0169107 A1 | 8/2006 | Taniguchi et al. | |

* cited by examiner

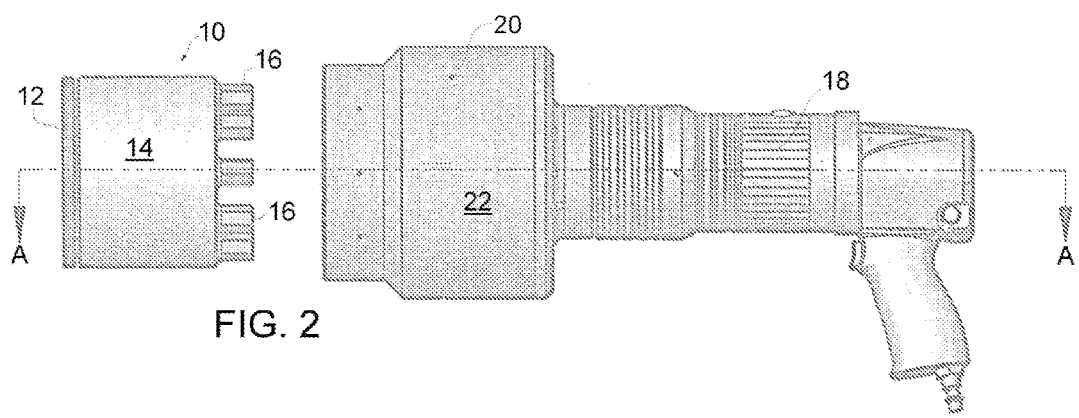
FIG. 2
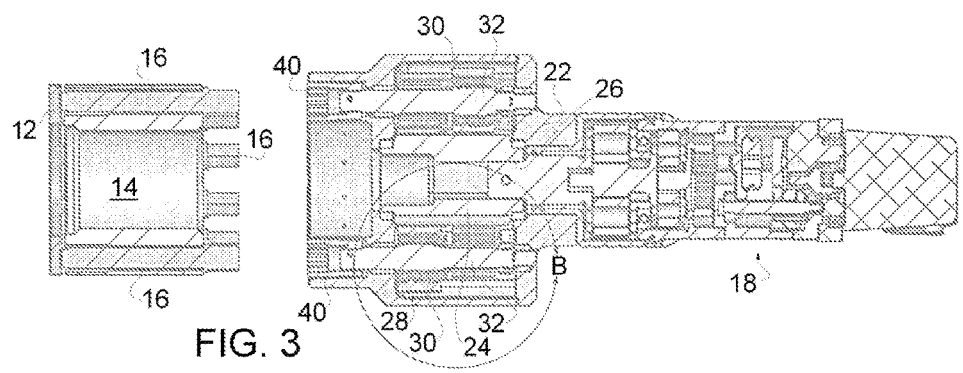
FIG. 3
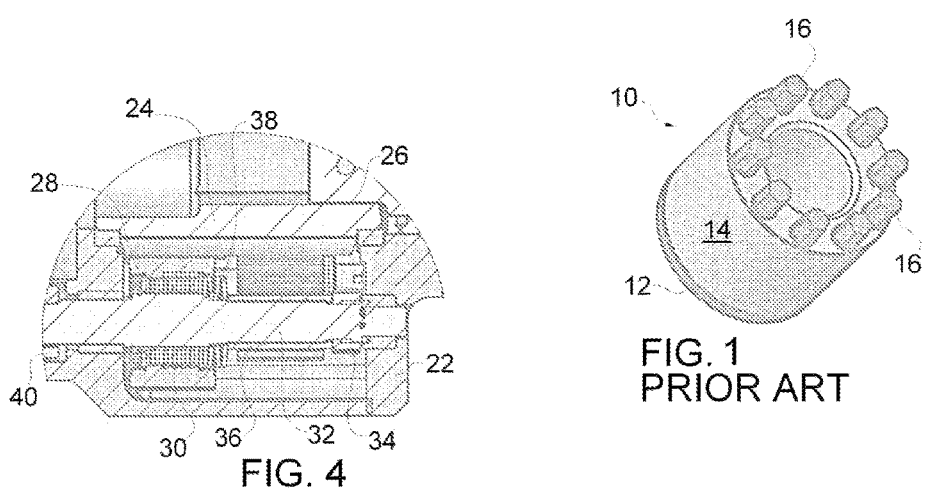
FIG. 4
FIG. 1
PRIOR ART

METHOD OF SIMULTANEOUSLY TENSIONING MULTIPLE JACKBOLTS OF A MULTI-JACKBOLT TENSIONER AND HANDHELD APPARATUS FOR PERFORMING SAME

RELATED APPLICATIONS

This application claims the benefit of U.S. Patent application Ser. No. 61/772,495 entitled "Method of Simultaneously Tensioning Multiple Jackbolts of a Multi-Jackbolt Tensioner and Handheld Apparatus for Performing Same"

BACKGROUND OF THE INVENTION

Field of the Invention

The present invention relates to a handheld apparatus for simultaneous tensioning the jackbolts of a multi-jackbolt tensioner and method of using same.

Background Information

Multi-Jackbolt Tensioner

A Multi-Jackbolt Tensioner (MJT) 10, such as sold under the Superbolt® brand, is generally used as a direct replacement for hex nuts, covered nuts, bolts, etc. of a size typically of 1" or greater; a representative example of an MJT 10 is shown in FIG. 1. A conventional (nut based) MJT 10 spins onto existing bolt or stud (not shown) providing a distinct method to "bolt up the joint". The typical MJT 10 consist of three components, i) a hardened washer 12 (or similar surface) to provide a hardened, flat surface for the jackbolts 16 to "push" against; ii) an often round nut body 14 that spins onto the existing bolt or stud and seats against the washer 12 hand tight in the original positioning; and iii) an annular array of jackbolts 16 that thread through the nut body 14 and are used to tighten the joint in pure tension. As noted, technically this is a nut version of an MJT 10 and there is a bolt version in which the nut body 14 is replaced with a threaded bolt body 14 threading into a threaded receiver. There can be other specialized versions of MJTs 10, such as thrust collar types, which are all included in the broad definition of an MJT 10, the operational distinctions of which are not critical for this discussion, as the present method and apparatus are applicable for all MJTs 10.

MJTs 10 have been described as eliminating the need for high powered and unsafe tooling, which increases worker safety and has been described as especially beneficial in applications with awkward locations. An MJT 10 takes the high preload requirements in large diameter bolting and breaks it down into manageable torques using the jackbolts 16 threaded through the body 14. In operation of a nut version of an MJT 10, the hardened washer 12 is installed first. Then the nut body 10 is threaded onto the existing stud or bolt, generally hand tight against the washer 12. The jackbolts 16 are then tightened and thrust against the hardened washer 12 to tension the joint. Accurate preload is achieved on the stud by torquing the individual jackbolts 16. Further discussions on the construction, operation and other aspects of MJTs 10 are found in U.S. Pat. Nos. 4,622,730, RE33,490, 4,927,305, 5,075,950, 5,083,889 and 6,112,396, which are incorporated herein by reference.

While MJTs 10 have eliminated the need for high powered tools they have introduced other issues to be addressed. For example, each jackbolt 16 of the MJT 10 must be separately tightened. In an application which implements multiple MJTs 10, the tightening of each jackbolt 16 can become time consuming, although not requiring high powered tooling. Consider a large assembly having ten bolts, each bolted using an MJT 10 with ten jackbolts 16, in this arrangement there are 100 individual jackbolts 16 to be tightened, each tightened to a designated tension.

Additionally, jackbolts 16 cannot be tightened in a manner that unbalances the nut body 14, thus they are often tightened in an alternating pattern, generally analogous to the well known "star pattern" used to tightened lug nuts of an automobile tire to prevent an unbalanced tire mounting. This specialized tightening method adds complexity to the tightening methodology for MJTs 10.

MJTs 10 provide a great advantage in many applications, however there remains a need to effectively and efficiently secure or tighten MJTs 10.

Multiple Fastener Drivers

It has been proposed to tighten multiple fasteners with a single tool. For example, U.S. Pat. No. 6,834,567, which is incorporated herein by reference, notes that machine tools with multiple spindles are used in assembly processes to tighten many fasteners at one time. These prior multiple spindle tools are quite often ineffective and such tools will often under-tighten one or more of the fasteners. This defect in multiple fastener tool design often leads to the inspector or the operator to use a separate tool to tighten the incorrect fasteners. In many instances, the manufacturer has resorted to using a single spindle nut runner in place of a multiple spindle tool. This solution results in a more time consuming operation.

U.S. Pat. No. 6,834,567 addresses this problem and discloses a single motor employed to drive a plurality of spindles with a gear arrangement placed between the motor and the spindles. The gear arrangement is comprised of a central gear, also known as a sun gear, and three planet gears fixed in a common carrier. In this design the central gear has a pitch circle smaller than the pitch circle of the planetary gears resulting in a minimal number of planetary gears that can be used, namely three planetary gears. Additionally each of the spindles has an input shaft and an output shaft and an adjustable in line reversible slip clutch is positioned between the input shaft and output shaft for each of the spindles. The design of U.S. Pat. No. 6,834,567 is not useful for MJT because the design is essentially limited to the three spindles as shown.

A review of proposed multi-fastener designs, and some related designs, may be beneficial for the present disclosure and understanding the advantages of the present invention. An alternative multi-fastener design is disclosed in U.S. Pat. No. 2,069,882 which discloses a wrench for tightening a plurality of securing members that includes a plurality of rotatable spindles operable to transmit tightening forces to the securing members, and a transmission operable by a single drive to rotate the several spindles independently to tighten the members to the same degree of tightness. The transmission includes pinions associated with the spindles, and an element, rotated by the drive, operable to successively cooperate with pairs of substantially opposite pinions to partially rotate the same.

U.S. Pat. No. 2,781,682 discloses a torque wrench with multiple spindles that provides a steady torque for setting screw-threaded fastenings while allowing the drive to slip when the fastening is tight.

U.S. Pat. No. 3,845,673 discloses a two-speed nut runner that has a low torque clutch designed for disengagement at a predetermined, relatively low torque. A second high torque clutch automatically takes over the transmission of torque at a lower speed and higher torque while holding the low torque clutch in a fully released position by means of a piston that is placed inside the output shaft of the nut runner.

U.S. Pat. No. 3,905,254 discloses a tool for loosening and removing the lug nuts of an automobile and truck wheels with selectively positioned non-rotating stabilized sockets.

U.S. Pat. No. 4,533,337 discloses a hydraulic torque impulse tool having a power inertia drive member, a hydraulic fluid chamber, and a cam driven piston in the fluid chamber for reciprocating movement.

U.S. Pat. No. 4,909,105 discloses an automated nut driving apparatus having a plurality of motors for rotating respective ones of a plurality of drive shafts to respective sockets holding nuts. The nut driver includes a plurality of universal joints connecting the sockets and drive shafts while allowing the sockets to be tilted with respect to the drive shafts. Universal joints are movable axially with respect to the drive shafts to allow the sockets to be retracted under reactive forces produced when the nuts engage the wheel attachment bolts.

U.S. Pat. No. 4,989,478 discloses an apparatus for tightening or loosening a plurality of bolts or other rotatable elements in which a drive socket and pair of reaction sockets are supported by an elongated beam member.

U.S. Pat. No. 5,092,410 discloses a hydraulic torque impulse generator using a dual piston arrangement to provide impacts to a rotatable anvil. Automatic shut-off and control apparatus is provided for limiting the pressure without reversing the direction of the driving clutch cage. A pressure venting arrangement permits one impact per revolution.

U.S. Pat. No. 5,125,298 discloses an automatic wheel assembly line in which an array of fastener members is prepared, corresponding in number and geometric pattern to the array of co-acting fastener members on the vehicle hub and to the array of bolt holes on the wheel assembly. The assembly includes a source of fasteners, a feeder mechanism having an outboard face, means defining a plurality of fastener receptacles, means operative to transport fasteners and means to move the loaded fasteners.

U.S. Pat. No. 5,572,905 discloses a torque driver including a laterally displaceable gear support member to carry an output spur gear. A biasing assembly biases the output spur gear into engagement with a pinion to which is applied an input torque greater than a desired output torque limit for a threaded fastener such as a nut or screw. A coiled output linkage connects the output spur gear with a fastener adaptor which may be a socket for a nut. A gear tooth profile provides a separation force that overcomes the bias to limit torque at the desired torque limit. Multiple fasteners may be rotated simultaneously to a desired torque limit if additional output spur gears are provided. A gauged selector mechanism is provided to laterally displace multiple driver members for fasteners arranged in differing configurations. The torque limit is adjustable and may be set different for fasteners within the same fastener configuration.

U.S. Pat. No. 6,253,644 discloses a torque wrench including a main housing with two or more preset torque devices which establishes a torque range. A drive shaft protrudes from the main housing and drives a drive gear disposed in the main housing in which when rotated, drives the geared torque devices positioned on either side of the drive gear. A helical spring connects two torque pistons and adjustably applies a regulated torque to the driven torque piston in response to movement of the drive torque piston.

U.S. Pat. No. 7,628,097 discloses a bolt-tightening tool for tightening two bolts at the same time. The bolt-tightening tool includes a first rotating shaft coupled with a motor shaft and a second rotating shaft coupled with a motor case. A first bolt is tightened with the first rotating shaft, while a second bolt is tightened with the second rotating shaft, whereby the first and the second bolts are tightened with a same amount of torque.

U.S. Published Pat. App. No. 2006-0169107 discloses a bolt tightening device which includes bolt tightening mechanisms, a torque input unit, a toothed belt and torque transmission units. The torque transmission units are provided with toothed pulleys and are integrated with the bolt tightening mechanisms. A toothed pulley is fixed to the torque input unit, and connected to all the toothed pulleys of the plural torque input units by the single toothed belt. Torque input to the torque input unit is transmitted to the bolt tightening mechanisms by the toothed belt, and used to simultaneously tighten, for example, seven bolts.

Thus the concept of a multiple fastener drivers, or multi-nut drivers, which simultaneously drive two or more fasteners, or nuts, is well known. However none of these existing designs are well suited for MJT application. The design of these prior art devices does not allow them to be adapted for conventional MJTs 10.

There is a need to provide a multiple nut driver that is designed to accommodate all of jackbolts 16 of an MJT 10, for simultaneous driving of all of the jackbolts 16. There is a need to have the jackbolts 16 of an MJT 10 to be driven to a designated torque with a multiple nut driver. There is need to have such a tool be hand held.

SUMMARY OF THE INVENTION

In accordance with one non-limiting embodiment of the present invention a method of simultaneously tensioning multiple jackbolts of a multi-jackbolt tensioner comprises the steps of: (a) providing a multiple jackbolt driving apparatus including a central drive gear mounted for rotation along a central drive gear axis, an annular array of spindles surrounding the central drive gear, each spindle independently mounted for rotation, with one spindle associated with one of the jackbolts, a socket on one end of each spindle configured to receive one of the series of jackbolts; and a spindle gear surrounding each spindle configured to rotate the spindle, the spindle gear meshed with the central drive gear to be rotated by the central drive gear, wherein at least one spindle gear is offset along the central drive gear axis from at least another spindle gear; (b) coupling the central drive gear to a source of rotating power for rotating the central drive gear; (c) coupling the multiple jackbolt driving apparatus with the multi jackbolt tensioner, wherein each jackbolt of the multi-jackbolt tensioner is engaged in one socket of the multiple jackbolt driving apparatus; and (d) operating the power source to rotate the central drive gear and simultaneously rotating the jackbolts of the multijackbolt tensioner.

The method of simultaneously tensioning multiple jackbolts of a multi-jackbolt tensioner according to the invention may further include a slip clutch positioned radially between each spindle gear and the associated spindle, wherein rotation of the jackbolts is up to a torque setting of the slip clutch. The method may further comprise the step of adjusting the torque setting of each slip clutch. The method may further comprise operating the power source to rotate the central drive gear and simultaneously rotating the jackbolts of the multi-jackbolt tensioner until each torque setting of each slip clutch is reached.

The method of simultaneously tensioning multiple jackbolts of a multi-jackbolt tensioner according to invention may further comprise the step of providing a visual indication of each spindle exceeding the torque setting on the slip clutch.

In accordance with one non-limiting embodiment of the present invention a handheld multiple fastener driving apparatus configured to simultaneously rotate an annular series of fasteners comprises: a central drive gear mounted for rotation along a central drive gear axis and configured to be coupled to a source of rotating power for rotating the central drive gear; an annular array of spindles surrounding the central drive gear, each spindle independently mounted for rotation, with one spindle associated with one of the series of fasteners; a socket on one end of each spindle configured to receive one of the series of fasteners; and a spindle gear surrounding each spindle configured to rotate the spindle, the spindle gear meshed with the central drive gear to be rotated by the central drive gear, wherein at least one spindle gear is offset along the central drive gear axis from at least another spindle gear.

The handheld multiple fastener driving apparatus according to the invention may further include an adjustable slip clutch positioned radially between each spindle gear and the associated spindle, wherein the slip clutch allows for rotation of the spindle below a torque setting of the slip clutch in the tightening direction. Each slip clutch includes a mechanism that allows a higher torque to be applied in the loosening direction for removal of bolts.

The handheld multiple fastener driving apparatus according to the invention may provide a plurality of spindle gears located at a first position along the central drive gear axis and a second plurality of spindle gears at a second position along the central drive gear axis which is offset along the central drive gear axis from the first position. The handheld multiple fastener driving apparatus may have at least three, at least four or at least five spindle gears at least at one of the first and second positions along the central drive gear axis.

The handheld multiple fastener driving apparatus according to the invention may provide that the pitch circles of the spindle gears at the first position along the central drive gear axis overlap some of the pitch circles of the spindle gears at the second position along the central drive gear axis when the pitch circles of the spindle gears are projected into a plane perpendicular to the central drive gear axis.

It is noted that, as used in this specification and the appended claims, the singular forms "a," "an," and "the" include plural referents unless expressly and unequivocally limited to one referent. The features that characterize the present invention are pointed out with particularity in the claims which are part of this disclosure. These and other features of the invention, its operating advantages and the specific objects obtained by its use will be more fully understood from the following detailed description and the operating examples.

These and other advantages are described in the brief description of the preferred embodiments in which like reference numeral represent like elements throughout.

BRIEF DESCRIPTION OF THE FIGURES

FIG. 1 is a perspective view of a conventional multi-jackbolt tensioner of the prior art;

FIG. 2 is a side elevation view of a conventional multi-jackbolt tensioner with a handheld apparatus for simultaneously tensioning the multiple jackbolts of the multi jackbolt tensioner according to one aspect of the present invention and a conventional hand held power source for the apparatus;

FIG. 3 is a sectional view of the multi jackbolt tensioner, handheld tensioning apparatus, and power source of FIG. 2;

FIG. 4 is an enlarged view of a portion of the powertrain for the handheld tensioning apparatus of FIG. 2;

DESCRIPTION OF THE PREFERRED EMBODIMENTS

Figure 6:
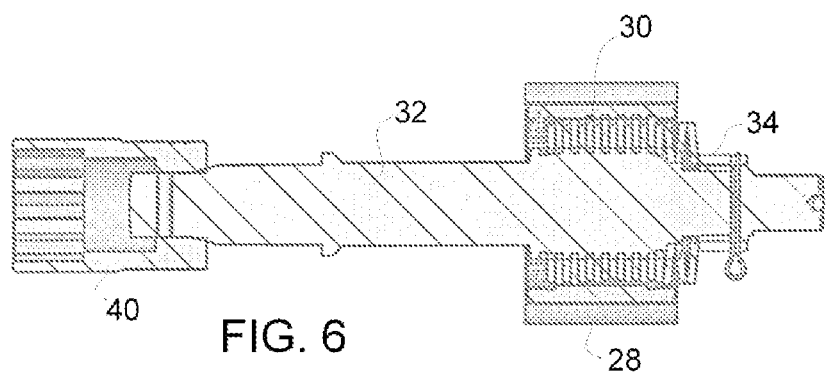
FIG. 6 is a sectional view of the clutch, spindle and socket assembly of FIG. 5.
Figure 5:
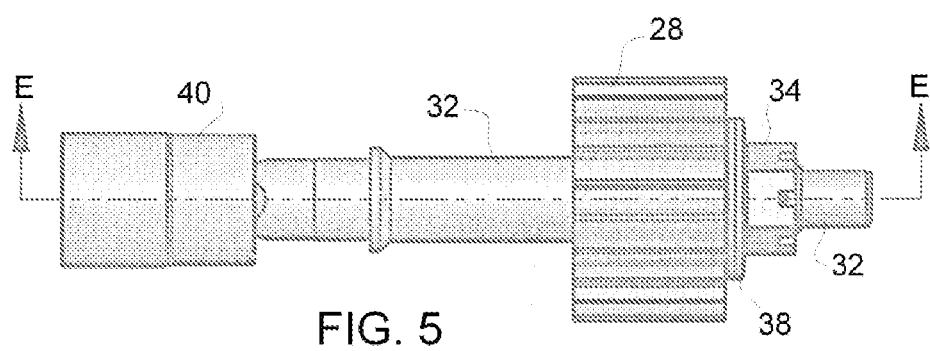
FIG. 5 is a side elevation view of a clutch, spindle and socket assembly of the handheld tensioning apparatus of FIG. 2 which drives one jackbolt of the multi jackbolt tensioner.

The present invention is directed to a method of simultaneously tensioning multiple jackbolts 16 of a multi jackbolt tensioner 10 and a handheld multiple fastener driving apparatus 20 for performing the same. As discussed above, a typical MJT 10 shown in FIG. 1 consist of a washer 12, a body 14, and an annular array of jackbolts 16. FIGS. 2-6 illustrate the handheld multiple fastener driving apparatus 20, also called a multiple jackbolt driving apparatus 20, and components thereof.

The handheld multiple fastener driving apparatus 20 includes a housing 22 which is configured to receive the input shaft of a power source 18, such as conventional nut runners 18. Both electric and pneumatic nut runners 18 are commonly available. Pneumatic nut runners 18 are powered by compressed air and vary in terms of air fittings and air consumption. Electric nut runners 18 typically use a DC controller as a power supply. The hand held cylindrical devices are lightweight and portable. Pistol-style nut runners 18 with trigger actuators as shown are also common. The fixed, typically square, drives (or output shafts) are typically designed to accept sockets.

There are several drive or output shaft styles and performance specifications for nut runners 18 that are also possible. In-line output shafts rotate concentrically with the drive train while offset output shafts have an axis of rotation parallel to but offset from the drive train axis. Right-angle output shafts rotate 90° to the drive train axis. Crowfoot output shafts (also called heads) are flat, extended and/or angled heads for difficult-to-access locations. The driving apparatus 20 can operate effectively with these known nut runners 18. Performance specifications for the nut runners 18 include torque range, rated free speed, and operating noise level. Length, diameter, and weight are other important considerations. The nut runner 18 can provide a number of other available features. For example, integral transducers are often used to provide feedback to the controller. Torque levels can be displayed on an analog meter with a needle or a digital readout with a numeric or alphanumeric display. Cycle counters may be provided to track the number of tightening cycles and display the results. The hand held nut runner 18 may include a reaction bar or stabilizer to facilitate ease of use. Finally the power source or nut runner 18 may even be a manual input in some applications.

The driving apparatus 20 includes a central drive gear 24 mounted for rotation in the housing 22 along a central drive gear axis. The central drive gear axis defines a longitudinal axis for the driving apparatus 20. The central drive gear 24 is configured to be coupled to the source of rotating power or nut runner 18 for rotating the central drive gear 24. Specifically the central drive gear 24 includes a central socket 26 shaped to match and receive the output shaft of the power source or nut runner 18 for rotating the central drive gear. The shape of socket 26 is determined by the output shaft shape of the desired associated nut runner 18, but square cross section is the most common.

The driving apparatus 20 includes an annular array of spindles 32 surrounding the central drive gear 24. Each spindle 32 independently mounted for rotation within the housing 22, with one spindle 32 associated with one of the series of jackbolts 16 of the MJT 10. In other words, the driving apparatus 20 includes the same number of spindles 32 as jackbolts 16 in the associated MJT 10. MJTs have been made containing a wide variety of numbers of jackbolts 16 but eight and ten jackbolts 16 per MJT 10 seem to be particularly common.

A spindle gear 28 surrounds each spindle 32 configured to rotate the spindle 32 as discussed below. The spindle gear 28 meshed with the central drive gear 24 to be rotated by the central drive gear 24. As will be described further below, at least one spindle gear 28 is offset along the central drive gear axis from at least another spindle gear 28 to allow for compact construction and basically accommodating the number of spindles 28 needed to be associated with the jackbolts 16 of conventional MJTs 10.

A slip clutch 30, also called a torque limiter, is positioned radially between each spindle gear 28 and the associated spindle 32, wherein the slip clutch 30 allows for rotation of the spindle 32 below a torque setting of the slip clutch 30 in the tightening direction. As will be understood by those in the art, when the force or torque resisting the spindle rotation 32 (i.e. the loading torque on the jackbolt 16) exceeds the torque setting of the slip clutch 30 in the tightening direction the spindle 32 will simple cease rotation despite the rotation of the associated spindle gear 28 due to the slipping of the slip clutch 30. The slip clutch 30 further includes a locking mechanism for operation in the removal of jackbolts 16, wherein the locking member allows the transmission of higher than the torque setting for jackbolt 16 un-tensioning.

The slip clutch 30 can be made in numerous configurations; however a series of steel and bronze discs is a well known, easily implemented and effective arrangement. The discs of the slip clutch 30 are alternately coupled to the spindle 32 and to the gear 28 as generally known in forming such a clutch mechanism. For further details or discussion of suitable slip clutch 30 construction see for example the MAXITORQ® brand multiple disc torque limiters sold by The Carlyle Johnson Machine Company, LLC.

The locking mechanism for increasing the relevant torque setting for reverse operation can also take many conventional forms, such as one way rotation member allowing free relative rotation in the slip clutch direction after the torque setting has been reached, but locking the members together in the opposite direction. Numerous other known designs are available for increasing the operational torque in the non-tensioning direction. Without such locking mechanism the driving apparatus could not effectively remove installed jackbolts 16 as the torque to begin removing a jackbolt 16 is higher than the torque setting used to install a jackbolt 16 (barring thread damage/stripping or other less common extraneous factors).

One advantage of the slip clutch 30 design is that the torque setting of each of the slip clutches 30 is adjustable. Specifically the torque setting of each of the slip clutches 30 is through a pair of spring washers 38 bearing against the discs, the tensions on which can be adjusted through a threaded clamping nut 34. The clamping nut 34 for each slip clutch 30 of each spindle 32 is located on the same side of the housing 22, thus some slip clutch 30 assemblies of the handheld tensioning apparatus 20 use an extension tube 36 to bridge from the clamping nut 34 to the loading spring washers 38.

In some embodiments the clamping nut 34 may be reasonably accessible to the user to allow for easy in-field adjustment of the specific torque settings. Alternatively the clamping nut 34 may be maintained in the housing 22 to limit the accessibility and effectively provide that the adjustment of the torque setting is set by the manufacturer or distributor of the tool 20 rather than easily changed in the field by the in-field user of the tool 20.

A socket 40 on one end of each spindle 32 configured to receive one of the series of jackbolts 16. The socket will have a drive interior matching the exterior of the jackbolt 16, such as hexagonal as shown or square or other desired shape. The socket 40 is removeably attached to the spindle 32 to allow the apparatus 20 to easily adapt to a distinct set of jackbolts 16 for the MJT 10 and to allow for easy replacement as needed. The end of the spindle 32 will connect to the socket 40 in a conventional fashion. The socket 40 may include an alignment mechanism configured to facilitate receipt of the jackbolt 16 therein. The alignment mechanism may be wide beveled or angled edges leading into the conventional drive part of the socket 40 whereby the initial axial advancement of the socket 40 onto the jackbolts 16 will serve to rotate the jackbolts 16 into alignment with drive part of the sockets 40 for proper seating.

The handheld driving apparatus 20 as shown provides a compact arrangement by including a plurality of spindle gears 32 and associated slip clutches 30 located at a first position along the central drive gear axis and a second plurality of spindle gears 32 and associated slip clutches 30 at a second position along the central drive gear axis which is offset along the central drive gear axis from the first position. In general the handheld multiple fastener driving apparatus 20 will have at least three, or more preferably four or more preferably five spindle gears at least at one of the first and second positions along the central drive gear axis.

The compact arrangement can be further highlighted by noting that in the driving apparatus 20 as shown the pitch circles of the spindle gears 28 at the first position along the central drive gear axis overlap some of the pitch circles of the spindle gears 28 at the second position along the central drive gear axis when the pitch circles of the spindle gears 28 are projected into a plane perpendicular to the central drive gear axis. In other words, looking down the central axis one would note the overlapped arrangement of the gears 28 and associated slip clutches 30. This compact arrangement allows the spindles 32 to match the number of bolts 16.

The present inventions gearing arrangement between the central drive gear 24 and the spindle gears 28 is generally known as a spur gear configuration. The present invention does not have a limit between the pitch diameters of the central drive gear 24 and the spindle gears 28. If the pitch diameter of the central drive gear 24 is smaller than the pitch diameters of the spindle gears 28 the present invention can be designed for up to a six jackbolt 16 MJT 10. If the pitch diameter of the central drive gear 24 is equal to the pitch diameters of the spindle gears 28 the present invention can be designed for up to a ten jackbolt 16 MJT 10. For MJT 10 with more than ten jackbolts 16 the pitch diameter of the central drive gear 24 will be larger than the pitch diameters of the spindle gears 28 to allow for the needed number of spindle gears 28.

Another aspect of the present invention is the ability of the user to see the proximate ends of each spindle 32 through openings in the housing 22. With the rotation of the spindles 32 visible to the user through the housing 22 a visual indication of the spindle 32 exceeding the torque setting on the slip clutch 30 is provided. Thus in operation the operator can run the power source 18, after engagement with the jackbolts 16, till he notices all of the spindles 32 are not moving. In addition to the visible indication described there is an audible response with each slip clutch 30 reaching its torque setting that will also be a feedback device for the user. Namely the audible change can prompt the user to verify that one or more of the slip clutches 30 have engaged and check the visual status of the spindles 32.

With the apparatus 10 described the method of the present invention should be reviewed. The method of simultaneously tensioning multiple jackbolts 16 of a multi jackbolt tensioner 10 according to the present invention includes the provision of the described multiple jackbolt driving apparatus 20. The method includes the coupling of the central drive gear 24 to a source of rotating power 18 for rotating the central drive gear 24, and the coupling of the multiple jackbolt driving apparatus 20 with the multi-jackbolt tensioner 10, wherein each jackbolt 16 of the multi-jackbolt tensioner 10 is engaged in one socket 40 of the multiple jackbolt driving apparatus 10. The method includes operating the power source to rotate the central drive gear and simultaneously rotating the jackbolts of the multi jackbolt tensioner.

The method of simultaneously tensioning multiple jackbolts 16 of a multi-jackbolt tensioner 10 according to invention further includes the use of the slip clutch 30 positioned radially between each spindle gear 28 and the associated spindle 32, wherein rotation of the jackbolts 16 is up to a torque setting of the slip clutch. The method further comprises the step of adjusting the torque setting of each slip clutch 30 to the setting associated with the jackbolt 16 in the particular application. As noted above the apparatus 12 provides a visual indication of each spindle 32 exceeding the torque setting on the associated slip clutch 30. The method may further comprise operating the power source 18 to rotate the central drive gear 24 and simultaneously rotating the jackbolts 16 of the multi-jackbolt tensioner 10 until each torque setting of each slip clutch 30 is reached. The method may further include the use of an alignment mechanism on each socket configured to facilitate receipt of the jackbolt therein.

The method of simultaneously loosing multiple jackbolts 16 of a multi-jackbolt tensioner 10 according to invention further includes the use of the locking mechanism as part of the slip clutch 30. This mechanism allows torques higher than the holding torque of each multiple jackbolt 16 to be applied in the reverse direction resulting in loosing of the jackbolts 16 for removal of the MJT 10 using the same tool 20.

It should be apparent that the tool or apparatus 20 is designed specifically for a single class of MJTs 10 to which the spindle 32 arrangement can be designed to match. Additionally as a practical range the present design of tool 20 will work as shown for total tension on the MJT 10 of up to 750 NM for tensioning, although higher torques can be applied for removal of the MJT 10.

Various modifications of the present invention may be made without departing from the spirit and scope thereof. The described embodiment is not intended to be restrictive of the present invention. The scope of the present invention is intended to be defined by the appended claims and equivalents thereto.

What is claimed is:

1. A method of simultaneously tensioning multiple jackbolts of a multi-jackbolt tensioner comprising the steps of:
    A. Providing a multiple jackbolt driving apparatus including a central drive gear mounted for rotation along a central drive gear axis, an annular array of spindles surrounding the central drive gear, each spindle independently mounted for rotation, with one spindle associated with one of the jackbolts, a socket on one end of each spindle configured to receive one of the series of jackbolts; a spindle gear surrounding each spindle configured to rotate the spindle, the spindle gear meshed with the central drive gear to be rotated by the central drive gear, wherein at least one spindle gear is offset along the central drive gear axis from at least another spindle gear; and a slip clutch positioned radially between each spindle gear and the associated spindle, wherein rotation of the jackbolts is up to a torque setting of the slip clutch;
    B. Coupling the central drive gear to a source of rotating power for rotating the central drive gear;
    C. Coupling the multiple jackbolt driving apparatus with the multi-jackbolt tensioner, wherein each jackbolt of the multi jackbolt tensioner is engaged in one socket of the multiple jackbolt driving apparatus; and
    D. Operating the power source to rotate the central drive gear and simultaneously rotating the jackbolts of the multi jackbolt tensioner.

2. The method of simultaneously tensioning multiple jackbolts of a multi-jackbolt tensioner according to claim 1 further comprising the step of adjusting the torque setting of each slip clutch.

3. The method of simultaneously tensioning multiple jackbolts of a multi-jackbolt tensioner according to claim 1 further comprising the step of providing a visual indication of each spindle exceeding the torque setting on the slip clutch.

4. The method of simultaneously tensioning multiple jackbolts of a multi-jackbolt tensioner according to claim 1 further comprising operating the power source to rotate the central drive gear and simultaneously rotating the jackbolts of the multi jackbolt tensioner until each torque setting of each slip clutch is reached.

5. The method of simultaneously tensioning multiple jackbolts of a multi-jackbolt tensioner according to claim 1 further comprising wherein each socket includes an alignment mechanism configured to facilitate receipt of the jackbolt therein.

6. The method of simultaneously tensioning multiple jackbolts of a multi-jackbolt tensioner according to claim 1 further comprising wherein a plurality of spindle gears are located at a first position along the central drive gear axis and a second plurality of spindle gears are at a second position along the central drive gear axis which is offset along the central drive gear axis from the first position.

7. The method of simultaneously tensioning multiple jackbolts of a multi-jackbolt tensioner according to claim 6 further comprising having at least five spindle gears at least at one of the first position along the central drive gear axis and the second position along the central drive gear axis.

8. The method of simultaneously tensioning multiple jackbolts of a multi-jackbolt tensioner according to claim 6 further comprising wherein the pitch circles of the spindle gears at the first position along the central drive gear axis overlap some of the pitch circles of the spindle gears at the second position along the central drive gear axis when the pitch circles of the spindle gears are projected into a plane perpendicular to the central drive gear axis.

9. A handheld multiple fastener driving apparatus configured to simultaneously rotate an annular series of fasteners comprising:
   A) A central drive gear mounted for rotation along a central drive gear axis and configured to be coupled to a source of rotating power for rotating the central drive gear;
   B) An annular array of spindles surrounding the central drive gear, each spindle independently mounted for rotation, with one spindle associated with one of the series of fasteners;
   C) A socket on one end of each spindle configured to receive one of the series of fasteners;
   D) A spindle gear surrounding each spindle configured to rotate the spindle, the spindle gear meshed with the central drive gear to be rotated by the central drive gear, wherein at least one spindle gear is offset along the central drive gear axis from at least another spindle gear; and
   E) a slip clutch positioned radially between each spindle gear and the associated spindle, wherein rotation of the jackbolts is up to a torque setting of the slip clutch.

10. The handheld multiple fastener driving apparatus according to claim 9 wherein the torque setting of the slip clutch is adjustable.

11. The handheld multiple fastener driving apparatus according to claim 10 further including a housing within which is mounted the central drive gear and the annular array of spindles, wherein the rotation of the spindles is visible to the user through the housing to provide a visual indication of the spindle exceeding the torque setting on the slip clutch.

12. The handheld multiple fastener driving apparatus according to claim 9 further including a housing within which is mounted the central drive gear and the annular array of spindles, wherein the rotation of the spindles is visible to the user through the housing to provide a visual indication of the spindle exceeding the torque setting on the slip clutch.

13. The handheld multiple fastener driving apparatus according to claim 9 wherein each socket includes an alignment mechanism configured to facilitate receipt of the fastener therein.

14. The handheld multiple fastener driving apparatus according to claim 9 wherein a plurality of spindle gears located at a first position along the central drive gear axis and a second plurality of spindle gears at a second position along the central drive gear axis which is offset along the central drive gear axis from the first position.

15. The handheld multiple fastener driving apparatus according to claim 14 having at least three spindle gears at the first position along the central drive gear axis and at least three spindle gears at the second position along the central drive gear axis.

16. The handheld multiple fastener driving apparatus according to claim 14 having at least five spindle gears at the first position along the central drive gear axis and at least five spindle gears at the second position along the central drive gear axis.

17. The handheld multiple fastener driving apparatus according to claim 14 wherein the pitch circles of the spindle gears at the first position along the central drive gear axis overlap some of the pitch circles of the spindle gears at the second position along the central drive gear axis when the pitch circles of the spindle gears are projected into a plane perpendicular to the central drive gear axis.

18. The handheld multiple fastener driving apparatus according to claim 9 wherein the central drive gear includes a central socket configured to receive an output shaft of the power source for rotating the central drive gear.

* * * * *